United States Patent [19]

Schneider

[11] 4,162,439

[45] Jul. 24, 1979

[54] RAPID-CHARGING CIRCUIT

[75] Inventor: Arthur Schneider, Völkenrode, Fed. Rep. of Germany

[73] Assignee: Rollei-Werke Franke & Heidecke, Braunschweig, Fed. Rep. of Germany

[21] Appl. No.: 811,058

[22] Filed: Jun. 29, 1977

[30] Foreign Application Priority Data

Aug. 3, 1976 [DE] Fed. Rep. of Germany ....... 2634863

[51] Int. Cl.² ................................................ H02J 7/10
[52] U.S. Cl. .................................. 320/40; 320/DIG. 1
[58] Field of Search ..................... 320/21, 22, 31, 32, 320/39, 40, DIG. 1

[56] References Cited

U.S. PATENT DOCUMENTS

| | | | |
|---|---|---|---|
| 3,421,066 | 1/1969 | Flynn et al. | 320/DIG. 1 |
| 3,535,608 | 10/1970 | Cramer et al. | 320/40 X |
| 3,576,487 | 4/1971 | Chase | 320/39 |
| 3,919,618 | 11/1975 | Coleman et al. | 320/39 |
| 4,039,920 | 8/1977 | Popp | 320/39 X |

FOREIGN PATENT DOCUMENTS 2544763 4/1977 Fed. Rep. of Germany ............ 320/39

*Primary Examiner*—Robert J. Hickey
*Attorney, Agent, or Firm*—Stonebraker, Shepard & Stephens

[57] ABSTRACT

A control circuit for rapid charging of an accumulator with a pulsating current includes a transistor arranged for switching the charge current on and off. The collector circuit of the transistor has an emitter resistor arranged to establish a control voltage that is substantially constant throughout each pulse of the charge current, and a comparator has an output connected to the base of the transistor and inputs from a reference voltage and the voltage on the accumulator so as to block the transistor when the charge voltage exceeds the reference voltage. The emitter resistor is preferably an incandescent lamp, a zener diode is preferably arranged in parallel with the lamp to provide a constant voltage for the base-emitter circuit of the transistor, and a complementary transistor is preferably connected with the switching transistor to form a two-stage transistor circuit.

2 Claims, 2 Drawing Figures

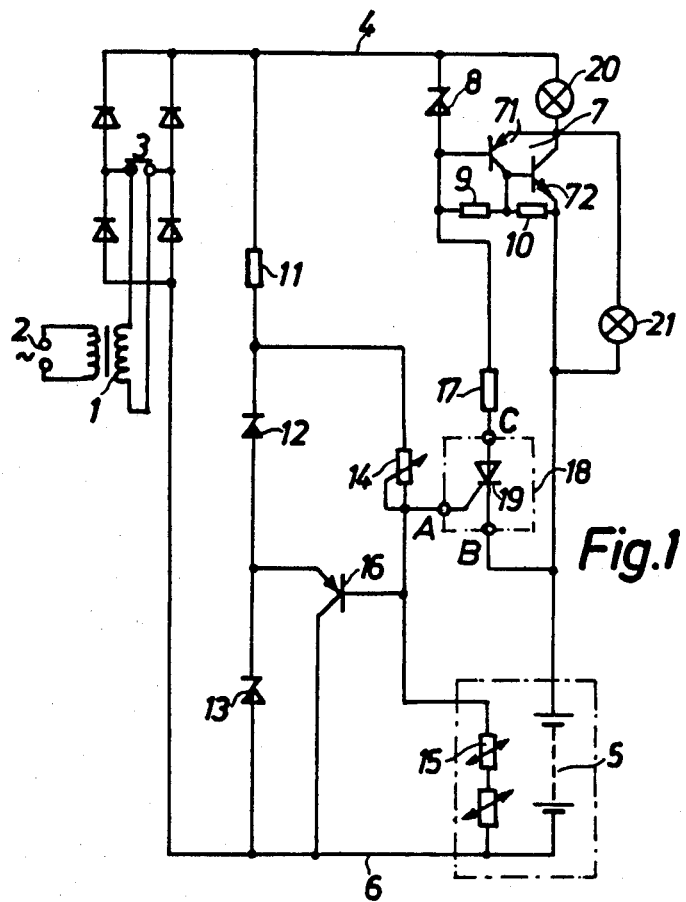
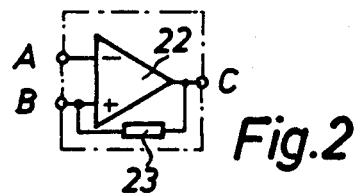
Fig.1
Fig.2

RAPID-CHARGING CIRCUIT

BACKGROUND OF THE INVENTION

The invention relates to circuitry for rapid charging of a battery or accumulator with a pulsating current derived from supply mains. An electronic switch is used in the charge circuit to switch on the charging current by means of a control electrode and to block the charge current when the voltage of the accumulator corresponds to an adjustable reference voltage.

In previously known charging circuits of this kind, the electronic switch in the charge circuit of the accumulator is formed as a thyristor having a control electrode connected to a voltage divider connected in parallel with a pulsating charge voltage. The cathode of the thyristor is connected to the positive pole of the accumulator, and the voltage divider is designed so that the voltage present on the control electrode of the thyristor is larger than the eventual desired voltage on the accumulator by the amount of the ignition voltage of the thyristor. The thyristor is then ignited because of the voltage provided by the voltage divider on the control electrode for each phase of the pulsating charge voltage. When the charge voltage of the accumulator reaches the ideal charge voltage, the difference between the control electrode potential and the cathode potential of the thyristor is no longer large enough to ignite the thyristor, and the charging of the accumulator terminates. One example of a circuit of this general nature is disclosed in my U.S. patent application Ser. No. 531,752, filed Dec. 11, 1974 (now abandoned) and in the corresponding German published specification (Offenlegungsschrift) No. 23 64 326.

Such a known circuit arrangement works satisfactorily for medium-size charge currents lying within the power range of thyristors requiring relatively small control currents. The voltage divider can then be dimensioned so that transverse currents flowing through it are very small relative to the charge current. Relatively large charge currents require thyristors of higher power and necessitate higher control circuit currents. Such large charge currents cannot be accommodated with a simple charge circuit, and increased expense must be incurred to achieve accurate charging of the accumulator to the desired voltage.

Another disadvantage of such a known circuit is that voltage fluctuations in the supply mains cause relatively high charge-current fluctuations, which can amount up to 30% for ordinary supply main voltage fluctuations of 10%. This causes substantial problems, because the magnitude of the charge current affects the voltage reached at the termination of the charge when the charge circuit switches off, and such large charge current variations can terminate the charging before the ideal voltage of the accumulator has been reached. If the mean charge current is made relatively low to avoid excessive charge currents in response to voltage fluctuations in the supply mains, an ordinary voltage drop in the supply mains can considerably reduce the charge current so that the voltage on the accumulator cannot reach the ideal, the charge circuit does not switch off, and the accumulator remains connected to the mains until it is thermally destroyed.

Another disadvantage of prior art circuits of this type is that the charge current cannot be selected to be very high because of the increased charge current that flows at the beginning of the charging operation with the accumulator fully discharged.

The invention involves recognition of the problems in prior art charging circuitry and proposes an improved charging circuit of this type that is simple, inexpensive, and reliable and able to accommodate high charge currents and normal voltage fluctuation in supply mains while maintaining the accuracy of the charge placed on the accumulator without endangering the accumulator or other circuit components.

SUMMARY OF THE INVENTION

The inventive circuit controls rapid charging of an accumulator with a pulsating current and includes an electronic switch arranged in a charging circuit of the accumulator to be switched on through a control electrode to charge the accumulator and to be blocked upon the accumulator reaching a voltage corresponding to an adjustable reference voltage. The electronic switch is formed as a transistor having an emitter resistor arranged to establish a control voltage that is substantially constant at least during the duration of a pulse of the charge current. A comparator has an output connected to the base of the transistor, which serves as the control electrode. One input of the comparator is connected to the charge voltage of the accumulator, and another input is connected to the reference voltage so that the output of the comparator assumes a potential that blocks the transistor when the charge voltage exceeds the reference voltage.

In the inventive circuit arrangement, the transistor takes over both the function of current limitation and controlling of the charge operation. Because of the constant potential difference between the emitter and the base or the control electrode of the transistor, the current flux through the transistor and thus the charge current of the accumulator are always substantially constant, regardless of the actual charge voltage of the accumulator. As soon as the charge voltage on the accumulator reaches the reference voltage, the control electrode of the transistor is provided with a blocking potential that blocks the transistor to switch off the charging of the accumulator. Preferably the transistor is coupled with a complementary transistor arranged in a two-stage transistor circuit.

The emitter resistance for the switching transistor is preferably formed as an incandescent lamp having a resistance that increases with increasing effective value of current through the lamp. This resistance characteristic provides an additional limiting effect for charge current fluctuations having very high current peaks. The constant voltage control for the switching transistor is preferably provided by a zener diode connected in parallel with the emitter resistor in the series connection of the base-emitter section of the switching transistor.

The comparator can be formed in two preferred ways according to the invention. One way is to form the comparator as a thyristor having an anode connected with a control electrode of the switching transistor, a cathode connected with the positive pole of the accumulator, and a control electrode connected to the reference voltage. Another way is to form the comparator as an operational amplifier having an output connected with the control electrode of the switching transistor, and having the inverting input connected with the reference voltage and the non-inverting input connected with the positive pole of the accumulator.

The inventive circuit preferably uses two feed conductors connected to the accumulator with the first feed conductor having a relatively high potential, and the second feed conductor having a relatively low potential. The reference voltage is taken from the tap of a potentiometer that is connected in series with a resistor having a negative temperature coefficient and arranged in thermal communication with the battery or accumulator. The resistor and the potentiometer are connected in parallel with a constant voltage source consisting of a series connection of two zener diodes connected between the feed conductors. The cathode of the first zener diode is connected with the potentiometer and the anode of the second zener diode is connected with the resistor. With such an arrangement, a pnp transistor is connected in parallel with the second zener diode, and the base of this transistor is connected to the junction between the potentiometer and the resistor.

The inventive circuitry achieves the object of reliably terminating the charging of the accumulator when the voltage of the accumulator equals the reference voltage so that the charge on the accumulator is reliably uniform. Furthermore, if the accumulator heats up to its maximum permissible temperature because of cell failure or some other circumstance, the charging is stopped before the full voltage is reached to protect the accumulator. The additional voltage control responsive to the temperature of the accumulator is not applied to the comparator but is arranged to change the reference voltage supplied to the comparator to block the charging operation.

BRIEF DESCRIPTION OF THE DRAWINGS

FIG. 1 is a schematic circuit diagram of a preferred embodiment of the inventive charging circuit showing a comparator formed as a thyristor; and FIG. 2 is a schematic circuit diagram of a comparator formed as an operational amplifier connectable into the circuitry of FIG. 1 in place of the thyristor comparator.

DETAILED DESCRIPTION OF THE PREFERRED EMBODIMENT

In the preferred embodiment of the inventive circuitry as shown in FIG. 1, a transformer 1 has its primary winding connected to an alternating current voltage of, for example 220 V, from supply mains 2, while its secondary winding is connected with the input of a two-way rectifier bridge circuit 3. The positive output from the rectifier bridge circuit 3 is supplied to a conductor 4 leading to a battery or accumulator 5 that is connected with the other output of the bridge circuit 3 via a conductor 6 having a potential that is lower than the potential in the conductor 4. A two-stage transistor circuit 7 is arranged in the path of the conductor 4 and consists of a pnp transistor 71 and an npn transistor 72 connected in a generally known way. The control electrode of the two-stage transistor circuit 7 is formed as the base of the switching transistor 71 and is connected through a zener diode 8 with the conductor 4 so that a constant potential difference is provided between the emitter and the base of the transistor 71. Resistors 9 and 10 are respectively connected in parallel with the base-collector circuit of the transistor 71 and the base-emitter circuit of the transistor 72.

An incandescent lamp 20 is arranged between the conductor 4 and the input of the two-stage transistor circuit 7 provided by the emitter of the transistor 71 and the collector of the transistor 72. The resistance of the incandescent lamp 20 forms the emitter resistance in the collector circuit of the transistor 71 and thus of the two-stage transistor circuit 7. The resistance of the incandescent lamp 20 increases with increase in current for effectively limiting very high charge current peaks, so that the resistance variation of the incandescent lamp 20 is preferred to an ordinary resistor. Furthermore, the incandescent lamp 20 indicates the flow of charge current so that its extinction indicates termination of the charge operation.

A second incandescent lamp 21 is arranged in parallel with the two-stage transistor circuit 7 and conducts current only when the two-stage transistor circuit is blocked upon termination of the charge operation as a result of the unavoidable discharge losses of the accumulator as its charge voltage drops slightly below the final charge voltage. As this occurs, a small charge current flows to maintain the charge voltage of the accumulator for the after-charging of its residual capacitance, and this is indicated by lighting up of the lamp 21.

Between the conductors 4 and 6 are arranged a series connection of a resistor 11 and two zener diodes 12 and 13. The series connection of the two zener diodes forms a constant voltage source in parallel with a voltage divider consisting of a potentiometer 14 and a resistor 15 having a negative temperature coefficient. The resistor 15 is arranged between the cells of the accumulator in thermal communication with the accumulator so that it can detect the temperature of the accumulator cells. A pnp transistor 16 is arranged in parallel with the zener diode 13, and the base of transistor 16 is connected with the junction or connection point between the potentiometer 14 and the resistor 15.

The control electrode of the two-stage transistor circuit 7 is formed as the base of the switching transistor 71 and is connected with a positive pole of the accumulator 5 through a resistor 17 and a comparator 18 which is formed as a thyristor 19 in the embodiment of FIG. 1. The thyristor 19 has its anode connected with the control electrode of the two-stage transistor circuit 7, its cathode connected with the positive pole of the accumulator 5, and its control electrode connected with the tap of the voltage divider provided by the potentiometer 14 and the resistor 15.

As long as the voltage on the accumulator 5 is less than the reference voltage established by the potentiometer 14, the thyristor 19 ignites on every half-phase of the pulsating current occurring at the output of the rectifier 3, because the control electrode potential of the thyristor 19 is greater than the anode potential. This causes the current to flow through the zener diode 8 and the resistor 17 so that a constant voltage drop occurs on the zener diode 8, and the circuit 7 becomes conductive. A charge current then flows through the lamp 20 and the transistor 72 to the accumulator 5, and this is indicated by lighting up of the lamp 20.

As soon as the charge voltage on the accumulator 5 reaches the reference voltage provided by the potentiometer 14, the control electrode potential and the anode potential of the thyristor 19 are of equal magnitude so that the thyristor 19 can no longer ignite with the recurring pulsating voltage. This switches off the current flow through the zener diode 8 and removes the potential across the emitter-base circuit of the switching transistor 71 so that the two-stage transistor circuit 7 is blocked and the charging of the accumulator 5 terminates.

The voltage divider provided by the potentiometer 14 and the resistor 15 is designed so that at temperatures below a limit temperature of the accumulator 5 the voltage drop on the resistor 15 is greater than the fixed voltage of the zener diode 13. If the temperature of the accumulator 5 rises to approach its limit temperature, the resistance value of the resistor 15 lowers substantially so that the potential on the base of the transistor 16 becomes less than the potential on the emitter of the transistor 16, which then conducts. This short-circuits the zener diode 13, and the voltage value of the constant voltage source provided by zener diodes 12 and 13 is halved. This drops the reference voltage derived from the tap of the potentiometer 14 considerably so that the reference voltage drops below the mean voltage value of the charge voltage of the accumulator, and this value is settable. This blocks thyristor 19 and switches off the circuit 7 to terminate the charge operation.

The actual charge current for the accumulator 5 is conducted by the transistor 72, so that the thyristor 19 is not loaded with the charge current. It conducts only relatively slight currents that hardly affect the heating of the thyristor 19. This helps achieve the objective of stopping the charging of the accumulator 5 at a value that is independent of the heating of the circuit element (transistor 72) conducting the charge current so that the charging is always terminated exactly upon reaching the same ideal voltage value on the accumulator 5.

In place of the thyristor 19 arranged in the comparator 18 in the embodiment of FIG. 1, an operational amplifier 22 as shown in FIG. 2 can be used in comparator 18. The connections a, b, and c, for the comparator 18 as shown in FIG. 1, conform to the connections a, b, and c shown in FIG. 2 for arranging the operational amplifier 22 to serve as the comparator 18. For such use, the output of the operational amplifier 22 is connected through a resistor 23 with the non-inverting input. As shown by the connections a, b, and c, the output of the operational amplifier 22 is connected through the resistor 17 with the base of the transistor 71 serving as the control electrode of the two-stage transistor circuit 7. The non-inverting input to the operational amplifier 22 is connected with the positive pole of the accumulator 5, and the inverting input of the operational amplifier 22 is connected with the reference voltage provided at the tap of the potentiometer 14.

The inventive circuitry using the operational amplifier 22 in the comparator 18 operates in the same way as described above. As long as the actual charge voltage of the accumulator 5 is less than the reference voltage supplied to the inverting input, the output of the operational amplifier 22 has a negative potential so that the base of the transistor 71 is always more negative than its emitter. This makes the circuit 7 conductive and charges the accumulator 5. As soon as the accumulator voltage exceeds the reference voltage by a small predetermined amount, the output of the operational amplifier 22 changes to a positive potential that blocks the circuit 7 and terminates the charging operation.

What is claimed is:

1. A circuit for controlling rapid charging of an accumulator with a pulsating current, said circuit including an electronic switch arranged in a charging circuit of said accumulator to be switched on through a control electrode to charge said accumulator and to be blocked upon said accumulator reaching a voltage corresponding to an adjustable reference voltage, said circuit being characterized by:
    (a) said electronic switch being formed as a transistor;
    (b) an emitter resistor arranged relative to said transistor;
    (c) means applying to said transistor a control voltage that is substantially constant at least during the duration of a pulse of said charge current;
    (d) a comparator;
    (e) a base of said transistor serving as said control electrode and being connected to the output of said comparator;
    (f) one input of said comparator being connected to the charge voltage of said accumulator;
    (g) another input of said comparator being connected to said reference voltage so that the output of said comparator assumes a potential that blocks said transistor when said charge voltage exceeds said reference voltage;
    (h) two feed conductors connected to said accumulator;
    (i) a first one of said conductors having a high potential and a second one of said conductors having a low potential;
    (j) a potentiometer arranged to provide said reference voltage;
    (k) a resistor connected in series with said potentiometer;
    (l) said resistor having a negative temperature coefficient and being arranged in thermal communication with said accumulator;
    (m) a constant voltage source arranged in parallel with said potentiometer and said resistor;
    (n) said constant voltage source being formed as a series connection of two zener diodes connected to said feed conductors;
    (o) a cathode of a first one of said zener diodes being connected with said potentiometer;
    (p) an anode of a second one of said zener diodes being connected with said resistor; and
    (q) a pnp transistor arranged in parallel with said second zener diode and having a base connected to a junction between said potentiometer and said resistor.

2. The invention defined in claim 1, further characterized by:
    (r) a zener diode being connected in parallel with said emitter resistor;
    (s) said emitter resistor being formed as an incandescent lamp; and
    (t) a complementary transistor coupled with said switch transistor to form a two-stage transistor circuit.

* * * * *